United States Patent Office 3,451,748
Patented June 24, 1969

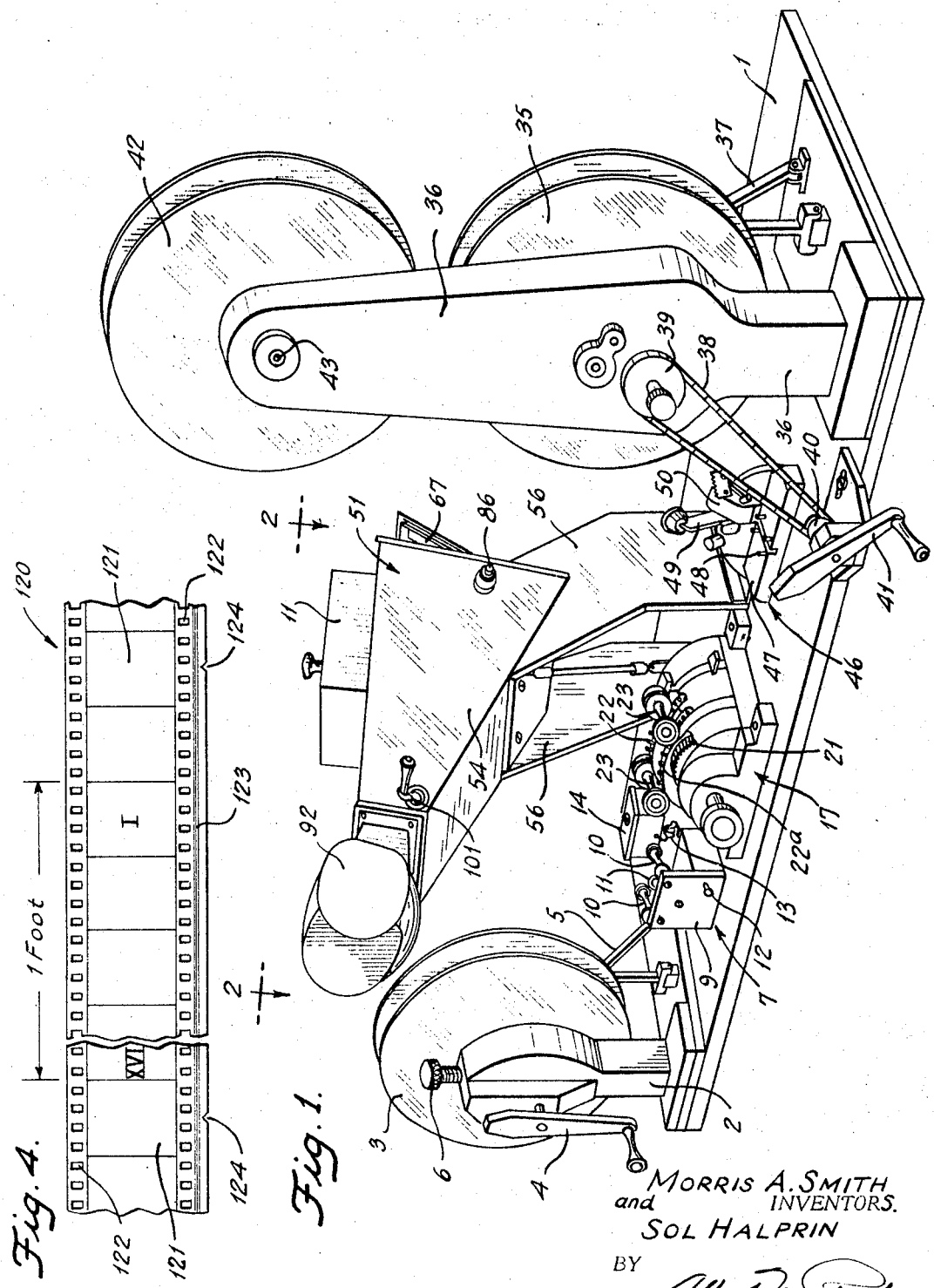

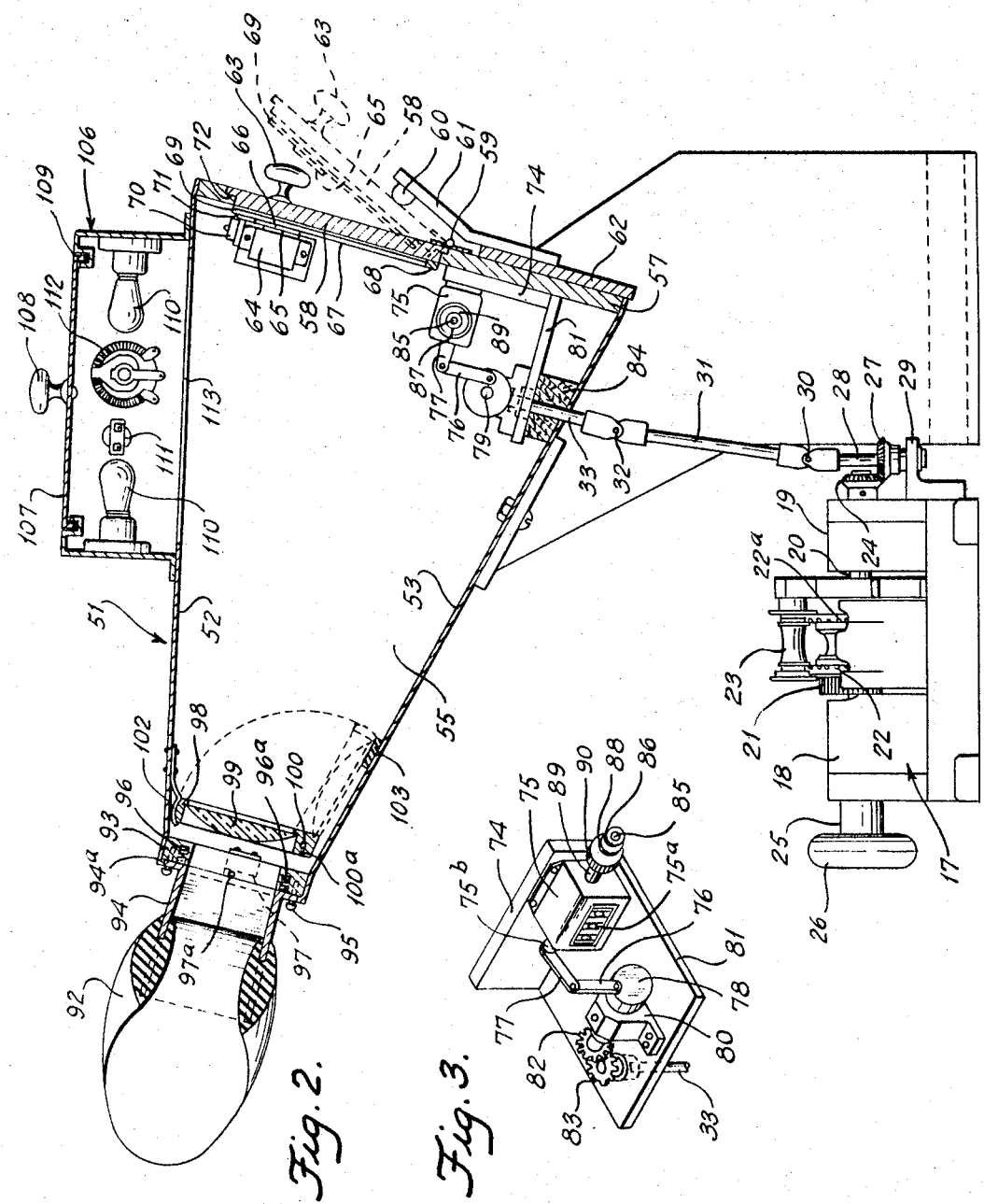

3,451,748
METHOD AND APPARATUS FOR EFFICIENTLY SEGREGATING UNWANTED FILM PRIOR TO PROCESSING
Sol Halprin, Beverly Hills, and Morris A. Smith, Los Angeles, Calif., assignors to Twentieth Century-Fox Film Corporation, New York, N.Y., a corporation of New York
Filed Mar. 30, 1967, Ser. No. 627,059
Int. Cl. C03b 19/18, 21/32; G03c 11/00
U.S. Cl. 352—38        10 Claims

ABSTRACT OF THE DISCLOSURE

A method and apparatus operable in the dark for segregating unwanted sections of unprocessed exposed negative motion picture film from wanted sections thereof where such film is fed from a take-off roll past a notch sensing buzzer, a film footage counter and a severing knife and splicer to take-up reels for the segragated sections. In this way subsequent processing is limited to the "wanted" sections. The film footage counter has an indicator within a viewing box which is lighted interiorly so that the operator can view the footage indicator while also viewing the film control card which shows him the disposition to be made of the film sections. Such viewing is done without exposing the film to any light, all the while the operator is winding a section of film up on one of the take-up reels and is listening for the sound of the buzzer responsive to the notches in the film edge denoting precise boundaries of film sections.

BACKGROUND OF THE INVENTION

Field of the invention

The invention pertains to that part of the activity of producing motion pictures which is concerned with taking the exposed negative film as removed from the camera, normally including a plurality of "takes" of each scene, and making up from it a negative, including only the "takes" selected for processing. That made up negative is then processed making it ready for use in printing release positives of the motion picture. The negative as finally made up and used in the making of release positives is normally nothing like the length of negative taken from the camera. Each scene is quite commonly shot, or photographed, several, or often many, times over until the director gets one that he is satisfied with. Thus the final negative to be used for printing positives must be made up of only the selected shot of each scene picked by the director for processing.

According to the invention this selection, or segregation, is done by taking the exposed negative as it comes from the camera without any processing and proceeding in the dark to run it past a footage counter sprocket and a film notch responsive device. While this is being done the operator looks into a viewing box where he can see the footage counter reading in feet and frames as well as seeing the film control card. That card shows him generally the range of footage encompassed by each shooting of each scene, and shows him which shooting of the scene the director has selected for processing, or for junking. This selection is done on the basis of footage and frame counts relayed by the cameraman to his assistant, who records that information on the card along with the directions of the director as to what to do with that shooting of the scene. Footage readings alone, however, are not foolproof, for one cannot always rely on the camera man to count exactly or give the exact count to the assistant taking down the information. Aside from the possibility of an error in footage there is also the possibility of error in the frame count. Thus, since the camera man notches the edge of the film every time he stops the camera, the distance between notches gives an exact reading and can be relied upon as a check against the footage to give the exact beginning and end points of the shot of the scene. The loss of part of a take selected for processing would be a serious matter.

By correlating the reading of the footage counter with the footage entered on the card for the take, the operator should be able to determine the beginning and end of the take. The sounding of the buzzer activated by the notch responsive device gives the operator a check against the footage and frames shown by the counter. Thus by following the teaching of the invention an operator working in the dark can feed an exposed negative film, before it is processed, from a take-off reel past the indicator stations to the severing and splicing station and then roll up the section on the appropriate one of the plurality of take-up reels.

DESCRIPTION OF THE PRIOR ART

The prior art practice for putting together a motion picture from the selected takes of the scenes photographed has been to develop and fix all of the exposed negative and then, viewing the negative while at the same time watching the footage of each take, select the take of each scene to be segregated from the rest and spliced together to make the final negative from which to make prints. As to the remainder, the takes to be held and those to be dumped would also be segregated. This prior art practice, however, called for the labor and expense of processing all of the exposed negative, though only a small portion of it was to be used. Furthermore, if the take selected is scratched, or abraded, in the handling of it after it has been developed and fixed, this can never be completely removed, so remains and is reproduced in the positive prints made from the negative. The practice followed by the prior art is, accordingly, expensive and is likely to create and/or perpetuate defects rather than eliminating them.

SUMMARY OF THE INVENTION

The invention simplifies and economizes upon the practices of the prior art and achieves improved results thereover. By taking the negative film, after it has been exposed, but before it has been processed in any way, and segregating the various sections of it in the dark, applicants are able to put together the final negative to be processed without wasting the time, money and labor involved in first developing and fixing the whole of the negative, and, after that, selecting the portions to be processed, those to be held, and those to be junked. Applicants have found that an operator can readily effect segregation in the dark, relating the footage shown by the counter to that on the camerman's card, both visible in a light tight viewing box as he reels the film along. The notches made by the camera man at each stoppage of the film give him a check through the notch sensor and buzzer actuated thereby for the extent of the take. This is all the operator needs to know to show him which portions of the unprocessed negative to hold, to junk, or to splice together to make up the negative to be processed. All of this film handling the operator can readily do while working in the dark.

Any scratches or abrasions imparted to the film prior to any processing of it, such as in the cutting and splicing, if handling of it, are by no means as damaging as is the case if that happens after the film is developed and fixed. That is because the actions of developing and fixing tend, in a large part, to fill and eliminate any abrasions or scratches, with the result that the negative film selected and spliced prior to processing, in accordance with the invention, is considerably improved over prior art films where the complete negative developed and fixed before the scene take selection was effected.

As to the apparatus for enabling the invention to be carried out, certain individual elements of it are old in and of themselves, but the assembly of them as here achieved to provide apparatus enabling precise segregation and reassembly of the various film sections, all accomplished in the dark, is novel and unique.

BRIEF DESCRIPTION OF THE DRAWING

The apparatus of the invention and for carrying out the method thereof is shown on the accompanying drawing as follows:

FIG. 1 is a perspective view of the complete apparatus in accordance with the invention;

FIG. 2 is an enlarged vertical section thereof taken on line 2—2 of FIG. 1 and looking in the directions of the arrows;

FIG. 3 is an enlarged perspective view of the footage counter and driving mechanism therefor as employed in the viewing box; and FIG. 4 is a plan view of a section of photographic motion picture film illustrating the aspects of it which are utilized in the carrying out of the invention.

DESCRIPTION OF THE PREFERRED EMBODIMENT

The apparatus of the invention and for carrying out the method thereof is all shown as mounted on a base 1 in the form of an elongated platform. At the left hand end of this base, as viewed in FIG. 1, an upstanding support 2 carries a film reel 3 mounted on the support 2 on a horizontal axle for rotation by the crank 4. Additional support means for the other end of the axle is shown at 5. Also suitable means is provided actuated by the knurled screw 6 for exerting a drag upon the action of the reel 3 if desired. The next element to the right along the base 1 from the support 2 is the notch sensor, for sensing the notches in the edge of the film running by. This element, generally indicated at 7, has a base 8 carrying the actual sensing device, commonly in the form of a pivotally mounted roller arranged to actuate a micro-switch when the roller falls into the film notch. Alternately the sensor could be a radiation sensitive device actuated by radiation of a wave length to which the emulsion on the film does not respond. Such mechanical and radiation responsive devices are well known in the art and need not be detailed here. An upstanding face plate 9 carries a pair of rollers 10 under which the film passes while passing over an intermediate roller 11 to position the film for sensing. A reset switch is provided at 12 for resetting the sensing device after it has been actuated.

Suitable connecting means 13 connects the sensing device with the buzzer box 14 containing the actual buzzer, the operating means therefor, and the control switch to control the intensity of its sound.

The measuring of the film passing by in terms of feet and frames is effected by the measuring device 17, shown generally as the next element to the right on the base 1. The device 17, partially shown in enlarged form in FIG. 2, has a pair of upstanding journal supports 18 and 19 in which a shaft 20 is journaled. This shaft carries and is driven by a large drum type sprocket 22 whose teeth 22a are engaged by the film as the film passes by this station. The film is held down on the sprocket 22 so that its perforations remain in engagement with the teeth of the sprocket by means of yieldably mounted hold down rollers 23, one overlying the sprocket at the side from which the film arrives, with the other at the departure side. Thus film running under the first of the rollers 23 engages the teeth on the sprocket 22 positively and in a manner to positively turn that sprocket. Hand turning of the sprocket for frame indexing is effected by turning the knurled edge indexing dial 21 also secured to axle 20. The shaft 20, at its right hand end, carries the bevel gear 24 keyed thereto. The left hand end of the shaft 20 is secured in the shank 25 of a handwheel 26 which can also be used for turning the gear 24 by hand if desired.

The bevel gear 24 engages another bevel gear 27 mounted on a short shaft 28 which is journaled in the bracket 29 extending out from the left hand end of the sprocket mounting. Shaft 28 is connected through linkage 30 to shaft 31 to thereby drive shaft 31 and shaft 31 in turn is connected through linkage 32 to drive shaft 33 for a purpose to be described in connection with a description of the viewing box.

Normally film to be handled by the apparatus of the invention would have sixteen picture frames to the foot and there would be four sprocket holes for each frame. Thus a common, though not necessarily limiting, form of drum sprocket 22 would carry sixty-four teeth positioned to receive the sprocket holes in the film. One full revolution of the sprocket 22 would accordingly result from the feeding of one foot of film. The shaft 20 would also, of course, make one revolution. It can be readily seen that the counter indicator can be made to read in feet plus frames. Sprockets with the other than sixty-four teeth could be used with gear ratios set to provide readings in the desired units. However, the sprocket, such as 22, should preferably have its number of teeth corresponding to multiples of frames.

Film leaving the footage counter mechanism 17 proceeds to the right as seen in FIG. 1, and, if it is a section selected for printing, it is wound right upon the take-up reel 35. This reel is mounted on a horizontal axle carried by the bracket 36, and is held thereon by means of a holding member 37. The reel 35 is driven by means of a belt 38 running over pulleys 39 and 40, the latter of which is turned by the crank handle 41.

The support 36, instead of carrying just one reel as does the support 2, extends up above the take-up reel 35 far enough to rotatably support a second take-up reel 42. This reel, which can also be driven along with, or alternately to, the reel 35 by the use of a suitable belt, has its shaft mounted on the bracket 36 at the position 43. The reel 43 would normally be used to receive that portion of the negative film which is to be held for possible furture use, commonly known in the industry as the "hold portion."

Besides the portion of the film to be processed as collected on the reel 35 and that to be held as collected on the reel 42, there may be also certain takes which are indicated to be junked, or thrown away. These takes need not be saved or wound up on any reel. They may just be dumped into a waste basket, though it is not uncommon for the operator to wind them up in small coils by hand and put them aside.

In order to separate the sections of film into their various categories for winding up or discarding, a film severing and splicing device 46 is positioned on the base 1 between the member 17 and the bracket 36. This severing and splicing device, not per se novel, has a base 47 carrying film locating means 48 and has a back support to which is pivoted the severing knife 49 and splicing means 50. Thus should the disposition directed for the particular take call for severing and for any splicing, this can all be done at the severing and splicing station and in the dark. Any known type of splicing can be employed, though the use of pressure sensitive tape, or stainless steel pins, appear at present to be preferred.

Considering now the viewing box, shown generally at 51, this is generally in the form of a hollow truncated pyramid having a top wall 52, a bottom wall 53, one side wall 54, and the other side wall 55. This box 51 is mounted on and above the base 1, overlying the film counting position by means of a pair of brackets 56.

The larger end of the viewing box 51 is closed by a wooden, or other, panel 57 which includes as a portion thereof a pivoted door 58. The pivot 59 for this door extends horizontally along the bottom edge of the door so that the door swings outwardly about its bottom edge. It is prevented from opening too far, however, by means of a stop 60 carried by a bracket 61 secured through an intermediate member 62 to the fixed lower portion of the panel 57. The door 58 carries an operating knob 63 by means of which it is opened and closed. The door is held in closed position by means of magnetic door stops 64, two of which are preferably provided, carried by the side walls of the viewing box and having magnet members 65 engaging mated magnet members 66, the latter mounted on the door, one adjacent each side edge thereof. It is to be noted that the peripheries of the door and of the panel opening receiving the same have mated rabbetted portions, as seen at 72, to prevent the escape of light from the interior of the viewing box. The magnet members 65 and 66 are set so that when the door 58 is moved into closed position it is held tightly closed.

On its inner side the door 58 carries a pair of inwardly opening channel members 67 facing each other from the opposite sides of the door. A stop member 68 extends across at the bottom of the door, thus crossing and closing the ends of the channels 67. The channels and stop member provide a holding slot on the inner side of the door 58 open at its upper end 69 so that the film control card for the particular film being viewed can be slid into place when the door is opened, as shown in the dotted line configuration of FIG. 2. Then, when the door is closed, the card is held in position for viewing in the viewing box.

Before departing from the description of the door, attention is directed to the door controlled switch 70 which is secured in place at the upper side of one of the magnetic means 64 and has a spring pressed switch actuating plunger 71 which engages the outer face of the channel member 67 as the door is brought into closed position. When this plunger 71 is at any position other than its innermost one, the circuit for the lights of the viewing box is broken so that the lights can only be on when the door 58 is fully closed. Hence any opening of the door 63 while unprocessed film is being run through the apparatus will immediately result in the light being automatically shut off so that the film cannot be damaged.

A carrying element 74 is secured to the inner surface of the end panel 57 just below the bottom edge of the door opening. The carrying element 74 in the form of a cleat of wood, or other suitable material, has the footage counter indicator 75 secured to its inner face with the indicia 75a of the counter indicator being exposed towards the opposite, or viewing, side of the viewing box. This counter has a main shaft turned by a crank 75b which is in turn actuated by means of the pivoted links 76 and 77 with the link 76 being pivotally secured to the face of a disc crank 78. The disc crank 78 is turned by a shaft 79 which is journaled in the support 80 carried by a base plate 81 extending inwardly away from the panel 57 at the lower edge of the carrying member 74.

The shaft 79 has a bevel gear 72 secured to the end thereof, which gear is meshed with a mating bevel gear 83 secured to the upper end of the shaft 33. As previously pointed out, the shaft 33 is driven, through various intermediates, by the film running over the sprocket 22 at the counter position. The shaft 33 has to extend through a hole in the bottom wall 53 of the light box so care must be taken to see that no light can escape out to shine downwardly towards the film. Such light is trapped by means of a felt packing 84 secured between the base 81 and the bottom wall 53 of the viewing box and snugly engaging the shaft 33 passing therethrough.

As seen in FIGS. 1 and 3, the counter 75 has a shaft extending out at the right hand side thereof, as best seen in FIG. 3, which shaft extends out through the side wall 54 of the viewing box as seen in FIG. 1. This shaft is in effect an assembly of concentric shafts, one for each set of indicia of the counter 75, with each shaft carrying a knurled reset knob so that the indicia can be readily reset. The counter is of the pre-determining type and the operator sets it to the highest footage as indicated on the film card. As the film goes through the machine, the footage shown by the counter diminishes. This is because the film is being fed into the machine in reverse after it is exposed. The innermost of such shafts 85 has a knurled reset knob 86 keyed thereto, while the next outer shaft 87 (see FIG. 2), has the knurled reset knob 88 keyed thereto, then the largest of the three shafts, 89, has the knurled reset knob 90 keyed to it. Where the outermost shaft 89 passes out through the wall 54 of the viewing box suitable light trap means are provided, of which the means shown at 84 is a non-limiting example.

An eye piece 92 into which the viewing operator inserts his face to view the interior of the viewing box while preventing light from escaping outwardly therefrom, is mounted at the opposite end of the viewing box from the panel 57. A mounting collar 93 is secured in the mouth of the small end of the viewing box 51 opposite the panel 57. The rubber-like resilient eye piece 92 is carried by a frame 94 whose inner end extends outwardly in the form of a collar 94a overlying the collar 93. The collar 94a is formed with a plurality of perforations through it at spaced positions. By this means the collar 94a is slidably mounted on screws 95. The inner ends of these screws are secured in the mounting member 93, but the screws are left upstanding to a sufficient distance as seen at 95 to enable the collar 94a to ride outwardly a short distance with respect to the mounting 93. Movement in this outward direction is normally effected by the action of a plurality of springs 96 mounted in bores 96a in the member 93 and acting against the undersurface of the collar 94a to force it outwardly on the screws 95.

The purpose of this movable mounting of the frame 94 carrying the eye piece 92 is to assure that when the operator removes his face from the eye piece the light within the viewing box will be shut off, so none can escape to affect the film. Shutting off the light is achieved by means of a switch 97 whose actuating member 97a is engaged by the collar 94a when that collar is moved into its innermost position. At such position, assuming all other switches in the circuit are closed, the circuit is closed and the lights for the viewing box are turned on. As soon, however, as the observer moves his face away from the eye piece, or in fact just as soon as he relieves the pressure of his face from the eyepiece, the springs 96 push the collar 94a upward on the screws 95, the switch member 97 is disengaged, the circuit is broken and the lights are shut off.

A lens ring 98 carrying a magnifying lens 99, principally for use by far-sighted people, is positioned within the viewing box a short distance inwardly from the small end mounting 93. This lens ring 98 in the form of a frame, is pivotally mounted across its lower horizontal portion by a pivot pin 100 to which the lens ring is affixed by means such as the set screw 100a. The pivot pin 100 has its ends pivotally mounted in the opposite side walls 54 and 55 of the viewing box by suitable light tight mountings. In addition, the right hand end of the pivot pin, as seen in FIG. 1, terminates in a handle 101, on the outside of the viewing box, by means of which the operator can turn the pin 100 and thus rotate the lens ring between the fixed and free positions shown in FIG. 2. The position of the handle 101 will also indicate what position the lens ring is in within the viewing box.

A spring clamp 102 is secured to the inner upper surface of the viewing box and has a portion which engages the outer surface of the lens ring to hold it in operative position when the presence of the magnifying lens in the line of sight is desired. When the lens ring and lens are to be moved out of the way, however, the spring 102 yields under the turning action imparted through the handle 101 allowing the lens ring to be swung down and seat on the resilient bumper 103 secured to the inner surface of the bottom wall 53 of the viewing box.

The light box providing illumination for the interior of the viewing box is positioned on the top thereof adjacent the larger end. This is generally a rectangular box 106 having a removable cover 107 providing access to its interior. A knob 108 is provided for manipulation of the cover. The cover 107 has its edges flanged downwardly to seat into channels formed around the opening in the box. This provides a light trap, as seen at 109, all the way around the periphery of the cover.

Lamps 110 are mounted in lampholders secured to the interior of the opposite ends of the light box 106. A master switch 111 with a control operable from the outside of the light box (not shown), provides direct means for turning the lights on and off. In addition, a rheostat 112 mounted on the side wall of the light box and with a control on the outside thereof is in circuit with the lights and the switches and enables the brightness of the lamps to be controlled. Obviously if the interior of the viewing box is to be illuminated by light from the lamps 110 there must be a substantial opening 113 in the top wall of the viewing box in communication with the interior of the light box 106.

No wiring diagram for the lamp circuit has been included, because it is so simple that it is deemed to be obvious and unnecessary to include. When it is taken into consideration that the unprocessed film must not be exposed to any light it is recognized that the interior of the viewing box must be dark until all light passages are closed. The door 58 must be closed and the operator must have fully inserted his face in the face mask 92. It is thus quite clear that the switches 70 and 97 must be in series in a single circuit. That circuit must also include the main switch 111 and the rheostat 112. Preferably that light circuit will be included in one lead of a parallel circuit powering the lamp 110. Alternately the lamps as well as all the switches could be in one series circuit, but a parallel circuit for the lamps is preferred for obvious reasons. Two lamps 110 are provided so that if one lamp burns out the other takes over at approximately the same brightness provided by the two lamps. There being less voltage drop across the rheostat there is more voltage across the remaining lamp.

A section of film 120, shown in FIG. 4, is illustrative of film usable in the particular apparatus shown for carrying out the method of the invention. Such film has frames 121, there are four sprocket holes 122 for each frame and there is a sound track 123 along one edge but spaced in far enough to enable notches 124 to be made in the edge without interfering with the sound track. An indication is given of frames making up a foot, while the edge notches are shown as being a little off the frame lines as could well happen.

OPERATION

In the carrying out of the method of the invention for which the apparatus just described is one suitable embodiment, it is useful to have an understanding of the step, or steps, previously taken to provide the exposed but unprocessed film to be worked upon. Let us say that the camera man on the set where a motion picture is being shot starts the day with a new thousand foot reel of negative film. The first thing he should do is to notch the edge of the film, using the means in the camera provided therefor, in order to show the start of the first take. An assistant standing by the camera man is ready to take down on a card such information as the scene number, the take number, the footage plus frames of film used for each take of the scenes, and whether that take is to be processed, to be held, or to be junked. Then, in the course of the day, if that reel of say one thousand feet of film is used up, the reel, and card going along with it, are turned in to the processing lab and are eventually turned over to the operator for the carrying out of the invention by operating the apparatus of the invention in the dark. The operator may, however, receive a reel of negative film only a part of which has been exposed and the card he receives will thus relate only to that part.

On receiving the film and card the operator inserts the card in the receptacle for it on the inside of the door 58 sliding the card in from the top 69 with the door in the open dotted line position, as shown in FIG. 2. Light from the lamps 110 is, of course, extinguished. Then the operator places the reel of exposed negative film on the support 2, as shown at 3, and threads the film through the notch sensor 7 and into film measuring device 17. In the film measuring device 17 he brings the sprocket holes of the film into registry with the teeth of the large drum-like sprocket 22 setting the rollers 23 in order to hold the film in engagement with the sprocket. As already pointed out, with a sixty-four tooth sprocket a film having sixteen frames to the foot and four perforations to the frame will cause the sprocket to make one revolution as one foot of film is pulled by rotating the sprocket as it goes. Thus the operator seeks to start by setting the hand operated indexing dial 21 and setting the counter 75 so that the counter, which reads in feet and frames, can be started out at zero feet, zero frames, of the take. Having a leader strip in advance of the take enables the operator, who has already looked at the card to get the disposition of this take, knows whether to engage that leader strip with the reel 35, or the reel 42, or be prepared to just junk the first section of film. He is now in a position to proceed.

The section of film shown in FIG. 4 illustrates the measuring of the film in feet and frames and shows that the notching of the edge of the film may well be randomly positioned with respect to the footage and also even with respect to frames.

When the operator is ready to proceed, he turns on the main switch 111 of the light box and inserts his face into the face mask 10, pushing forward enough to move the switch contact 97a into contacting position, thus turning on the light so that he can read the card. To do this he probably positions the lens 99 in his path of vision, for this lens, being in the form of a reading lens, is preferred by most operators. As illustrated it can be moved up out of the way if it is not wanted.

From the showing of the first scene and first take on the card, the operator can see, if he has not already looked at the card before he turned out the lights, whether the initial portion of the film is to be junked, held, or processed. Thus he either feeds it on to the hold reel 42, the "to be processed" reel 35, or junks it by just dropping it into a basket, or reeling it up by hand to put it aside. Assuming, however, that the first section of film is to be held, the operator adjusts the driving means on the support 36 in order to enable the reel 42 to be driven by the crank 41 and then he proceeds to reel the film upon the reel 42. While doing so he is closely watching the counter to see when the footage and frames correspond to the number inserted on the card for the end of the first take. This showing may not necessarily come up on the indicator at exactly the same time as the buzzer 14 sounds from the roller controlling the micro-switch having fallen into one of the notches 124 in the film. The combination of reading the footage and frames on the indicator, as against listening for the sound of the buzzer, not only gives the operator a precise check on where the take ends, but the buzzer serves as a safety check in the event that the camera man gave the wrong footage or frame numbers to the assistant recording the information on the card, or even if the asistant recorded it wrong.

Having reached the end of the first take, the operator sees from viewing the card what is to be done with the next take. If it is, for instance, to be held the same as the first take just referred to, he merely continues reeling the film up on the reel 42. If, however, it has to be processed, he cuts it at the notch by the knife 49 and then feeds the next section on to the reel 35 reeling it up there.

Next, assuming that the take following the one reeled up on the reel 35 is to be held, then the film is cut again and the portion to be held is rolled up on the reel 42. It is not necessarily spliced to the preceding part before this is done, but it may be if desired. However, when a take to be processed is to be added to the take already reeled up on reel 35, it is desirable that some sort of splice be made between the film ends. Any gum type of splice can be used here, and the operators are adept at doing this work in the dark. Commonly, however, the splice is made by applying a thin strip of pressure sensitive transparent material to the film ends, or by using stainless steel pins which go through the frames.

Assuming that the operator has a full thousand foot reel of film positioned at 3 he just continues on, operating in the dark, reeling the film along and segregating the portions to be processed from those to be held and also from those to be junked. Once the total footage to be segregated, whether it be a complete reel, or only a portion of one, has been taken off from the reel 3, all the film to be processed will have been collected together on the reel 35. This is all that needs to be processed at the outset at least. It will almost always be only a small part of the total footage exposed. Thus there will be a saving of a major portion of the expense of processing the whole of the negative. A better film will also result, since any abrasions or scratches on the unprocessed film will be minimized or completely removed in the processing.

While in the foregoing one assembly of certain elements has been shown for carrying out the method of the invention, it is to be understood that such assembly and the elements making up the same are for illustrative and not limiting purposes, and that other assemblies employing one or more different elements could well be made up without departing from the spirit or scope of the invention in either method or apparatus. Furthermore, it is to be understood that all matter shown in the accompanying drawing and described in the foregoing specification is for illustrative and not limiting purposes.

Having described our invention, what we claim and desire to secure by Letters Patent is:

We claim:

1. A method of segregating unwanted from wanted sections of exposed motion picture film prior to processing the same, which comprises, passing a strip of exposed motion picture film prior to processing and in the dark past an indicator station, actuating an indicator in response to passage of the film, selecting sections of said film between indications that are effected at the time of exposing the film, separating certain of said selected sections of film from certain of the others thereof in the dark, and, while still in the dark, collecting certain of said sections on one collecting means and collecting the other of said sections on another collecting means.

2. The method as in claim 1 and discarding others of said sections of film.

3. The method as in claim 1, said selecting including measuring the footage of said film strip and correlating said measuring with the record of footage use recorded at the time of exposing said film.

4. The method as in claim 1 and effecting said selecting in response to audible signals, said indications being notches formed in the edge of the film at the time the same was exposed and causing said audible signals in response to the presence of said notches.

5. The method as in claim 1 and including, while passing said strip of film in the dark, causing said indicator for indicating the footage of film being passed by to be visible in an isolated lighted area, correlating said footage with data visible in said isolated lighted area and pre-recorded at the time of exposing said film; notching the edge of said film at the time of exposing the same at the beginning and end of such exposure to provide an exact indication, supplementing such footage indication of the portion of the film to be segregated from another portion thereof, providing an audible signal in response to said notches and effecting said segregation on the basis of said signals.

6. The method as in claim 5 and including proceeding in the dark with the following steps, severing one section of said film from another thereof wound up on one reel, winding said severed section up on a second reel, splicing together the end of the film following said severed section with the end of said section wound up on said reel and winding said film following said splice up on said one reel.

7. Apparatus for use in segregating sections of exposed negative motion picture film from other sections prior to processing of the film and in the dark, which comprises, film take-off means, film feed indicating means, means for passing film from said take-off past said indicating means, a light tight viewing box, means for mounting said viewing box in operable relationship with respect to said indicating means, counter means in said viewing box operatively connected with said indicating means, means for exposing indicia within said viewing box in viewable relation with respect to said counter means, said viewing box having a viewing aperture therein, a face mask surrounding said viewing aperture and means for lighting the interior of said viewing box.

8. Apparatus as in claim 7 and including means mounting said face mask for short movement inwardly with respect to said viewing box, spring means acting to restore said face mask to outward position and similar means actuated by said face mask when in inward position to close the circuit including said lighting means.

9. Apparatus as in claim 7 and including film splicing and severing means positioned beyond said film indicating means and multiple reel film take-up means beyond said film severing and splicing means providing for the reeling up of film to be processed on one reel and the reeling up of film to be held on another reel.

10. Apparatus as in claim 7 and including said film indicating means including film edge notch sensing means and audible signal means operable in connection with said notch sensing means.

References Cited

UNITED STATES PATENTS

| | | |
|---|---|---|
| 2,706,218 | 4/1955 | Wootten. |
| 2,905,048 | 9/1959 | Miller. |
| 2,928,311 | 3/1960 | Strauss. |
| 3,374,723 | 3/1968 | Baumbach. |

JULIA E. COINER, *Primary Examiner.*

U.S. Cl. X.R.

352—56, 92, 130